United States Patent
Lightstone et al.

(10) Patent No.: US 7,912,798 B2
(45) Date of Patent: Mar. 22, 2011

(54) SYSTEM FOR ESTIMATING STORAGE REQUIREMENTS FOR A MULTI-DIMENSIONAL CLUSTERING DATA CONFIGURATION

(75) Inventors: Sam Sampson Lightstone, Toronto (CA); Sriram K. Padmanabhan, San Jose, CA (US); Richard E. Swagerman, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/209,071

(22) Filed: Sep. 11, 2008

(65) Prior Publication Data
US 2009/0006049 A1 Jan. 1, 2009

Related U.S. Application Data

(63) Continuation of application No. 10/993,567, filed on Nov. 19, 2004, now Pat. No. 7,440,986.

(30) Foreign Application Priority Data
Dec. 17, 2003 (CA) .................................... 2453608

(51) Int. Cl.
G06F 17/00 (2006.01)
G06N 5/00 (2006.01)
(52) U.S. Cl. ..................... 706/45; 707/999.1; 707/999.2; 707/999.102; 707/999.202; 707/999.205

(58) Field of Classification Search ..................... 706/45
See application file for complete search history.

(56) References Cited

U.S. PATENT DOCUMENTS

| | | | |
|---|---|---|---|
| 5,544,356 A | 8/1996 | Robinson et al. | |
| 5,742,814 A | 4/1998 | Balasa et al. | |
| 5,799,300 A | 8/1998 | Agrawal et al. | |
| 6,003,029 A | 12/1999 | Agrawal et al. | |

(Continued)

FOREIGN PATENT DOCUMENTS
WO    WO 00/16250 A1    3/2000

OTHER PUBLICATIONS
Ali et al., "Data Clustering and Its Applications", http://members.tripod.com/asim_saeed/paper.htm, Dec. 5, 2005.

(Continued)

*Primary Examiner* — Michael Holmes
(74) *Attorney, Agent, or Firm* — Kunzler Needham Massey & Thorpe

(57) ABSTRACT

A storage requirements estimating system estimates the storage required for a proposed multidimensional clustering data by modeling wasted space. The amount of wasted space is modeled by calculating the cardinality of the unique value of the clustering key for the proposed configuration. Cardinality may be determined by estimation techniques. Specific values for wasted space and total space may be determined in response to the determined cardinality. Comparison of estimates for different proposed clustering configurations facilitate a selection among proposed multidimensional clustering data configurations.

10 Claims, 4 Drawing Sheets

U.S. PATENT DOCUMENTS

| | | | |
|---|---|---|---|
| 6,012,058 | A | 1/2000 | Fayyad et al. |
| 6,286,016 | B1 | 9/2001 | Heller et al. |
| 6,453,383 | B1 | 9/2002 | Stoddard et al. |
| 6,542,893 | B1 | 4/2003 | Quernemoen |
| 6,591,356 | B2 | 7/2003 | McMurdie et al. |
| 6,633,882 | B1 | 10/2003 | Fayyad et al. |
| 6,654,756 | B1 | 11/2003 | Quernemoen et al. |
| 6,772,274 | B1 | 8/2004 | Estakhri |
| 7,174,344 | B2 | 2/2007 | Campos et al. |
| 7,222,176 | B1 | 5/2007 | Laurent et al. |
| 7,440,986 | B2 * | 10/2008 | Lightstone et al. ............ 1/1 |
| 7,483,873 | B2 * | 1/2009 | Bhattacharjee et al. ......... 1/1 |
| 2003/0028560 | A1 | 2/2003 | Kudrolli et al. |
| 2004/0158570 | A1 | 8/2004 | Thusoo et al. |
| 2006/0143238 | A1 | 6/2006 | Tamatsu |

OTHER PUBLICATIONS

Shukia et al., "Storage Estimation for Multidimensional Aggregates in the Presence of Hierarchies", Proceedings of the 22nd VLDB Conference, Mumbai, Bombay, Inda, 1996.

Lee et al., "On the Effective Clustering of Multidimensional Data Sequence", KAIST Department of Computer Science, CS/TR-200-154, Jun. 19, 2000.

Bayer, "The Universal B-Tree for Multidimensional Indexing", TUM-19637, Nov. 1996.

Expansion Storage MultiDimension Cluster Blocks or Cells "Space Waster", Google Search, Jun. 4, 2008.

Li, "A Mutual Semantic Endorsement Approach to Image Retrieval and Context Provision", Portal USPTO, The ACM Digital Library, Nov. 2005.

* cited by examiner

SYSTEM FOR ESTIMATING STORAGE REQUIREMENTS FOR A MULTI-DIMENSIONAL CLUSTERING DATA CONFIGURATION

CROSS-REFERENCES TO RELATED APPLICATIONS

The present application is a continuation of and claims benefit of U.S. patent application Ser. No. 10/993,567 entitled "Method for Estimating Storage Requirements for a Multi-Dimensional Clustering Data Configuration" and filed Nov. 19, 2004 now U.S. Pat. No. 7,440,986 for Sam Sampson Lightstone. The present application and also claims the priority of Canadian patent application, Serial No. 2,453,608, titled "Estimating Storage Requirements for a Multi-dimensional Clustering Data Configuration," which was filed on Dec. 17, 2003, and which is incorporated herein by reference.

FIELD OF THE INVENTION

The present invention relates in general to the field of data storage and more particularly to data clustering in a relational database system.

BACKGROUND OF THE INVENTION

Data clustering is a widely used technique in data management for storing data in a relational database system. Tuples of data are grouped on the basis of their logical similarity and co-located in nearby storage on a storage device. Data clustering optimizes the number of physical input/output (I/O) operations to reduce access time during processing. Data clustering can be performed in a single dimension when data is grouped using one logical similarity criterion, or in a plurality of dimensions (i.e. multidimensional data clustering (MDC)) when more than one logical criteria for data grouping is used (i.e. multiple dimensions in a data clustering solution. Multidimensional data clustering, driven by business intelligence, online analytical processing (OLAP), and batch application processing, has become more popular in data warehousing.

Although this technology has proven to be useful, it would be desirable to present additional improvements. A cost of providing multidimensional data clustering for more effective data processing can be data storage expansion. More specifically, data clustering is typically performed by logical units or cells where each cell represents a unique value of a clustering key. Each cell is composed of one or more physical storage blocks (if the cell contains data) having a blocking size of one or more pages of memory. Thus if the block size selected is too large or the cell data too scant, the result is a plethora of partially filled blocks and a waste of storage space. Consequently, clustering criteria must be selected carefully for their density and distribution across cells in order to effectively use disk space and avoid space wastage.

The problem of efficient disk space usage is exacerbated in a multidimensional clustering space, where each dimension contributes to the sparsity of the joined space. For example, consider a multidimensional table with clustering criteria that includes query dimensions A, B and C. Dimensions A, B and C may initially (i.e. before data clustering), be stored as a table of data that has sufficient distribution and density so that each of A, B or C would be useful clustering dimensions by themselves, leaving hardly any partially filled blocks. However, when A, B and C are all used as clustering dimension criteria jointly, then each unique combination of A, B and C results in a new cell. At least some and possibly many of the resulting multidimensional cells will necessarily have fewer records per cell than would be the case had the clustering key been composed of only one dimension. The result is cells that are less densely filled resulting in partially filled blocks and therefore in storage expansion.

Data storage expansion typically results in additional expenses related to the cost of acquiring and maintaining the additional physical storage devices. Furthermore, knowledge of the amount of expansion is desirable before physical data clustering is performed. Thus, there is a need for an awareness of the expansion amount for specific criteria to facilitate selection among the criteria. Increased database efficiency can result and at the same time an unsuitable database size can be prevented. The need for such a system has heretofore remained unsatisfied.

SUMMARY OF THE INVENTION

The present invention satisfies this need, and presents a system and service (collectively referred to herein as "the system" or "the present system") for estimating storage requirements for a multi-dimensional clustering data configuration. For a relational database system storing data, the present system determines an expansion of storage that may result from a candidate clustering scheme for the data. The present system comprises modeling anticipated space waste that results from the candidate clustering scheme and defining the expansion of storage in proportion to the anticipated space waste.

Modeling anticipated waste space comprises determining a cardinality of unique clusters to be created in accordance with the candidate clustering scheme and defining the anticipated space waste in proportion to the cardinality.

The cardinality comprises counting the cardinality directly from the data and evaluating the cardinality by sampling and extrapolating from the data.

The relational database system stores data in storage blocks having a block size, in which each of the unique clusters comprises a partially filled storage block from the data, and in which the defining the anticipated space waste comprises calculating the anticipated space waste as a proportion of the block size.

An anticipated space waste (W) is determined in accordance with the equation $W = n_{cell} * P_\% * \beta$, in which $n_{cell}$ is the cardinality of unique clusters, $P_\%$ is an estimated proportion of each partially filled block that is waste space, and $\beta$ is the block size.

The determining the cardinality comprises counting the cardinality directly from the data and evaluating the cardinality by sampling and extrapolating from the data.

The value of $P_\%$ is typically in the range of about 50% to about 100%.

The present system comprises determining an expansion of storage for each of a set of candidate clustering schemes and selecting one or more candidate clustering schemes in response to the expansion of storage determined for each scheme.

For a relational database system storing data, the present system provides in one embodiment a system to select one or more candidate clustering schemes for the data. The system comprises modeling anticipated space waste that may result from each candidate clustering scheme and selecting the one or more candidate schemes in response to the anticipated space waste.

Modeling anticipated space waste comprises determining cardinality of unique clusters to be created in accordance with each of the candidate clustering schemes. Modeling anticipated space waste further comprises defining the anticipated space waste for each candidate clustering scheme in proportion to the cardinality therefor.

Determining the cardinality comprises counting the cardinality directly from the data and evaluating the cardinality by sampling and extrapolating from the data.

The relational database system stores data in a plurality of storage blocks having a block size, in which each of the unique clusters comprises a partially filled storage block from the data, and in which defining the anticipated space waste comprises calculating the anticipated space waste for each candidate scheme as a proportion of the block size.

For a relational database system storing data, the present system provides a first computer program product having a computer readable medium tangibly embodying computer executable code to determine an expansion of storage to result from a candidate clustering scheme for the data. The first computer program product comprises code for modeling anticipated space waste that may result from the candidate clustering scheme, and defining the expansion of storage in proportion to the anticipated space waste.

The code for modeling anticipated space waste comprises a code for determining the cardinality of unique clusters to be created in accordance with the candidate clustering scheme and defining the anticipated space waste in proportion to the cardinality.

The code for determining the cardinality comprises a code for counting the cardinality directly from the data and a code for evaluating the cardinality by sampling and extrapolating from the data.

The relational database system stores data in a plurality of storage blocks having a block size, in which each of the unique clusters includes a partially filled storage block from the data, and in which the code for defining the anticipated space waste includes code for calculating the anticipated space waste as a proportion of the block size.

The anticipated space waste (W) is determined in accordance with the equation $W=n_{cell}*P_{\%}*\beta$, in which $n_{cell}$ is the cardinality of unique clusters, $P_{\%}$ is an estimated proportion of each partially filled block that is waste space, and $\beta$ is the block size.

The code for determining the cardinality comprises a code for counting the cardinality directly from the data and a code for evaluating the cardinality by sampling and extrapolating from the data.

The first computer program product comprises determining an expansion of storage for each of the candidate clustering schemes and providing the expansion of storage for selecting one or more candidate clustering schemes.

For a relational database system storing data in accordance with a first scheme, the present system provides a second computer program product having a computer readable medium tangibly embodying computer executable code to facilitate selecting one or more candidate clustering schemes for the data. The second computer program product comprises code for modeling anticipated space waste that may result from each candidate clustering scheme, and providing the anticipated space waste to facilitate selecting the one or more candidate schemes.

The code for modeling in the second computer program product comprises code for determining cardinality of unique clusters to be created in accordance with each of the candidate clustering schemes and defining the anticipated space waste for each candidate clustering scheme in proportion to the cardinality therefor.

The code for determining the cardinality comprises a code for counting the cardinality directly from the data and a code for evaluating the cardinality by sampling and extrapolating from the data.

The relational database system stores data in a plurality of storage blocks having a block size, in which each of the unique clusters includes a partially filled storage block from the data, and in which the code for defining the anticipated space waste comprises code for calculating the anticipated space waste for each candidate scheme as a proportion of the block size.

The relational database system is adapted to facilitate selecting one or more candidate clustering schemes for the data. The first relational database system comprises means for modeling anticipated space waste that may result from each candidate clustering scheme, and means for providing the anticipated space waste to facilitate selecting the one or more candidate schemes.

The means for modeling anticipated space waste is adapted to determine cardinality of unique clusters to be created in accordance with each of the candidate clustering schemes and define the anticipated space waste for each candidate clustering scheme in proportion to the cardinality therefor.

The means for modeling anticipated space waste is configured to determine the cardinality by counting the cardinality directly from the data and evaluating the cardinality by sampling and extrapolating from the data.

The first relational database system stores the data in a plurality of storage blocks having a block size, in which each of the unique clusters includes a partially filled storage block from the data, in which the means for modeling is configured to define the anticipated space waste by calculating the anticipated space waste for each candidate scheme as a proportion of the block size.

A second relational database system is adapted to determine an expansion of storage to result from a candidate clustering scheme for the data. The second relational database system comprises means for modeling anticipated space waste that may result from the candidate clustering scheme and means for defining the expansion of storage in proportion to the anticipated space waste.

The means for modeling anticipated space waste is adapted to determine cardinality of unique clusters to be created in accordance with the candidate clustering scheme and define the anticipated space waste in proportion to the cardinality.

Modeling anticipated space waste is configured to determine the cardinality by counting the cardinality directly from the data and evaluating the cardinality by sampling and extrapolating from the data.

The second relational database system stores data in a plurality of storage blocks having a block size, in which each of the unique clusters includes a partially filled storage block from the data, and in which the means for modeling is configured to define the anticipated space waste by calculating the anticipated space waste as a proportion of the block size.

The anticipated space waste (W) is determined in accordance with the equation $W=n_{cell}*P_{\%}*\beta$, in which $n_{cell}$ is the cardinality of unique clusters, $P_{\%}$ is an estimated proportion of each partially filled block that is waste space and $\beta$ is the block size.

In the second relational database system, the means for modeling determines the cardinality by counting the cardinality directly from the data and evaluating the cardinality by sampling and extrapolating from the data.

The second relational database further comprises means for determining an expansion of storage for each of a plurality of candidate clustering schemes, and means for providing the expansion of storage for selecting one or more candidate clustering schemes.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the OS (operating system) provides the facilities that can support the requirements of the present invention. A preferred embodiment is implemented in the C or C++ computer programming language (or other computer programming languages in conjunction with C/C++). Any limitations presented would be a result of a particular type of operating system, data processing system, or computer programming language, and thus would not be a limitation of the present invention.

Figure 1:
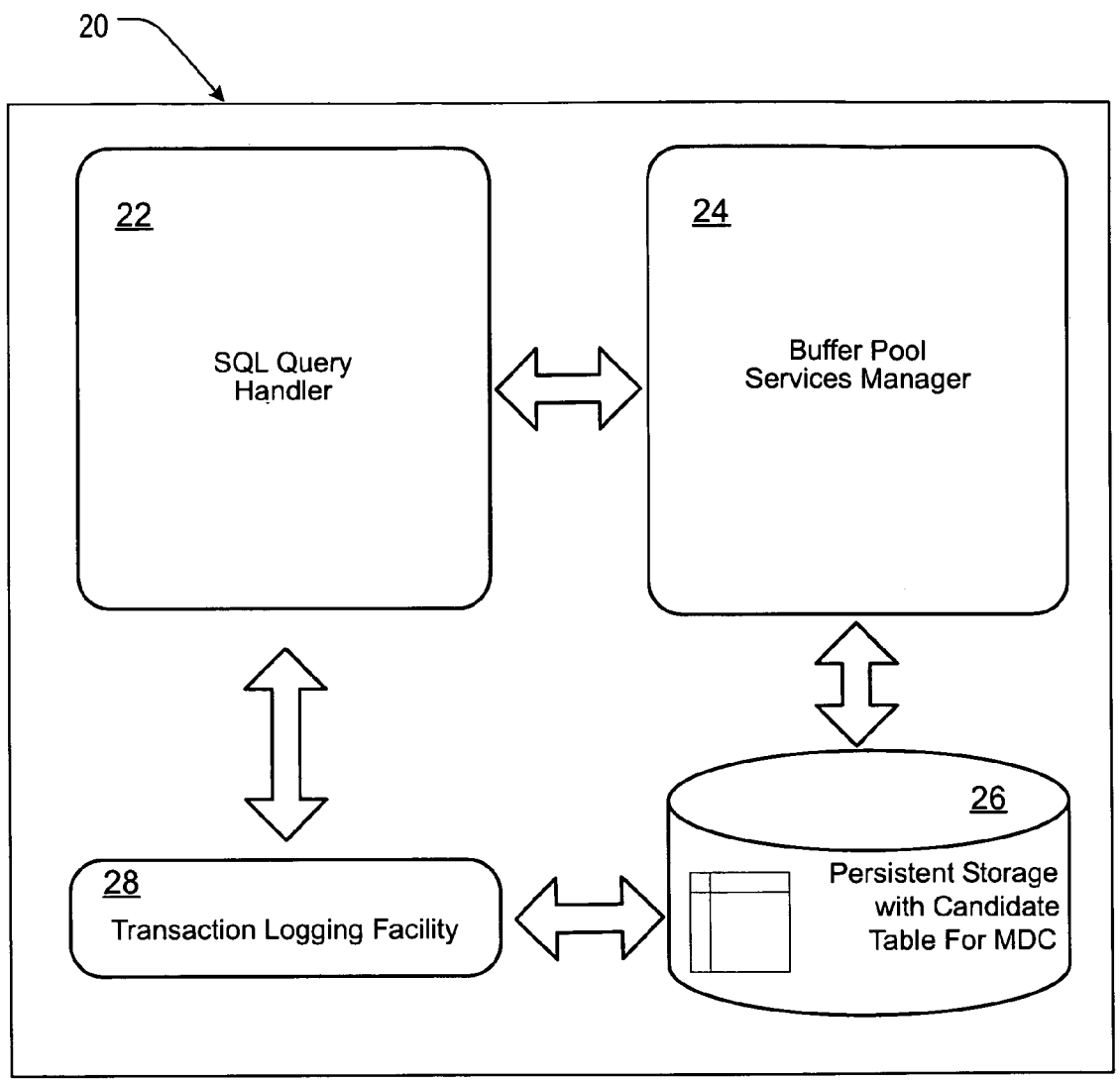
FIG. 1 is a schematic illustration of an exemplary operating environment in which a storage requirements estimating system for a multi-dimensional clustering data configuration of the present invention can be used.

FIG. 1 illustrates an exemplary information retrieval system 20 comprising an SQL query handler 22, a buffer pool services manager 24, a persistent storage with a candidate table for MDC reconfiguring 26 (also referenced herein as persistent storage 26), and a transaction logging facility 28. The SQL query handler 22 receives SQL queries, such as from a client application (not shown), compiles the queries, executes the queries using table data from the persistent storage 26 retrieved through the buffer pool services manager 24, provides responses to the queries and logs transactions to the transaction logging facility 28 therefor. Though not shown, the SQL query handler 22 may include a communications suite for communicating with client applications.

Figure 2:
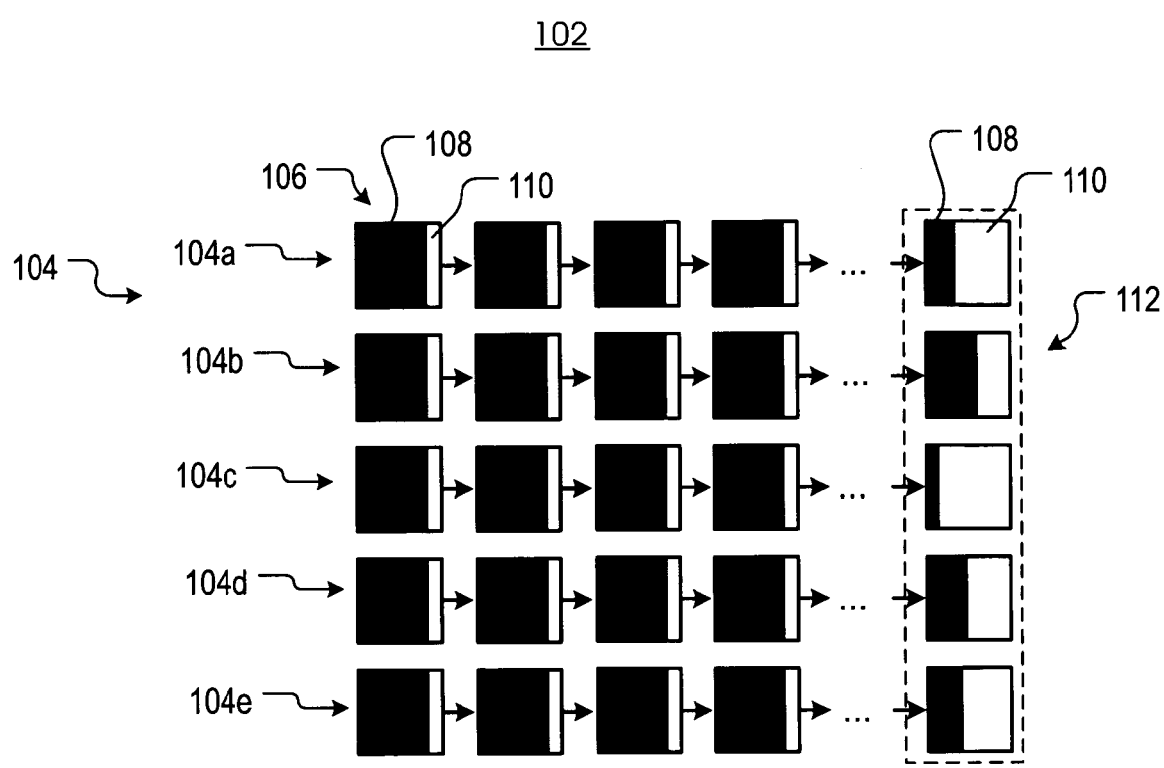
FIG. 2 is a diagram illustrating partially filled blocks at the ends of each cell of an exemplary multidimensional clustering storage structure (for example, table or tree structure) stored to a portion of a persistent data storage facility.

One embodiment of the invention is a system to determine the storage expansion that will result if a table is reconfigured using a set of candidate dimensions in accordance with multidimensional clustering techniques. To estimate the approximate space expansion that may or will result from a proposed MDC conversion of a table, it may be observed that the expansion comprises primarily space waste that may be attributed to the partially filled blocks at the end of each cell. FIG. 2 illustrates a portion of a persistent data storage facility that stores an MDC table 102. The data of this table is clustered in a number of cells such as cell 104a, cell 104b, cell 104c, cell 104d, and cell 104e (collectively referenced as cells 104). The data of each of the cells 104 is logically organized in a number of storage blocks such as storage blocks 106. Each of the storage blocks 106 has the same size. As is known to a person skilled in the art, each of the storage blocks such as storage block 106 is typically primarily filled with records containing useful information (illustrated in black e.g. filled data region 108), leaving only a relatively small portion of wasted space. A partially filled block (e.g. blocks 112) may have varying degrees of fill and an average percentage of fill may represent an estimate of the wasted space for each cell.

An estimation of the amount of wasted space can be determined in accordance with the hypothesis that each cell comprises a single partially filled block at the end of its block list. Thus, wasted space is proportional to the number of cells of the MDC table. Further, wasted space is proportional to the block size β of a last block. An average percentage of fill may be used to represent the amount of the block that is unused. Wasted space may thus be estimated using the following equation:

$$W = n_{cell} * P_{\%} * \beta, \quad (1)$$

wherein, W is the amount of wasted space, $n_{cell}$ is a total number of used cells, $P_{\%}$ is a percentage fill parameter and β is a storage block size. The percentage fill parameter is arbitrary and can be defined by a user.

For practical purposes, it is recommended that $P_{\%}$ be a value in the range of 50% to 100%. A value for $P_{\%}$ in the range of 65% to 75% is recommended. On the basis of performed experimentation, a percentage parameter value of 0.65 is considered as sufficient. However, the accuracy of the waste percentage is not particularly critical because a purpose of the system disclosed is to estimate a gross expansion of storage space and is not required to obtain a highly precise estimate of space wastage.

Figure 3:
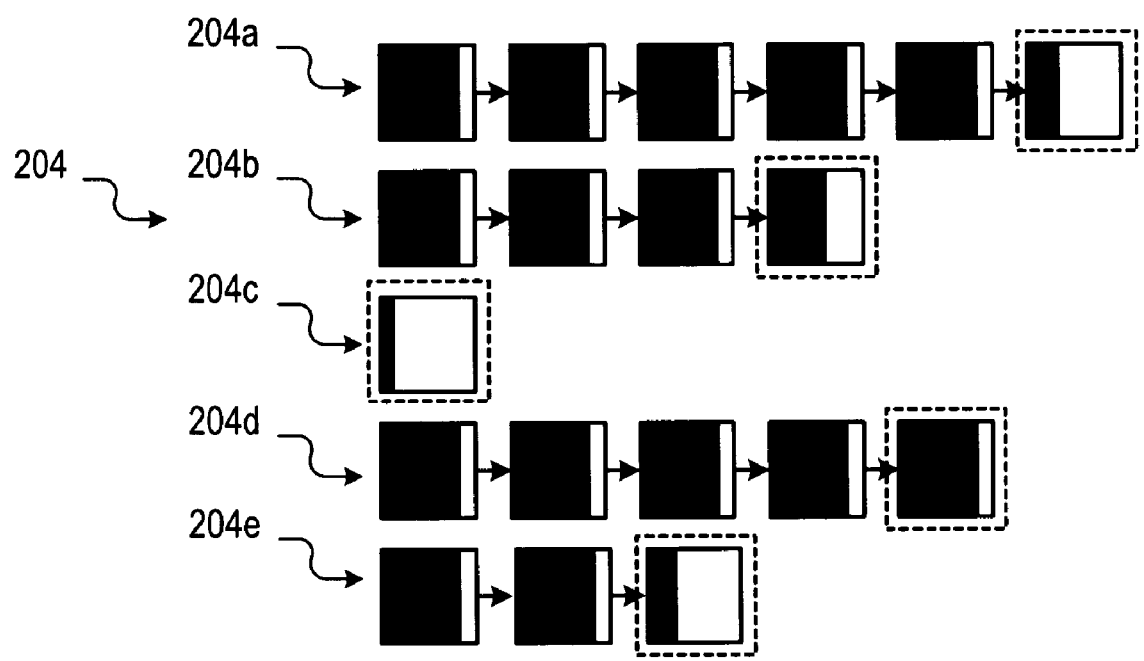
FIG. 3 is a diagram illustrating partially filled blocks of the ends of different sized cells.

While FIG. 2 illustrates cells of an MDC table exhibiting relatively even cell density (i.e. each cell has approximately the same number of records), FIG. 3 illustrates an MDC table of varying cell density. As is apparent, some cells such as cell 204a, cell 204b, cell 204c, cell 204d, and cell 204e (collectively referenced as cells 204) have more storage blocks than other cells. However, the hypothesis remains that each of the cells 204 has a single partially filled storage block, and therefore the space waste can be modeled as a function of the number of logical cells 204a-204e in the table.

In one embodiment of the invention, any of a plurality of techniques may be employed to determine the number of cells ($n_{cell}$). Exemplary techniques are described, namely basic storage expansion estimation, sampled storage expansion, parallel (multiplexed) request, and sampled-parallel. For purposes of illustration only, each of the techniques is described for estimating the storage expansion under MDC for a clustering key comprising three dimensions {A, B, C} for a table named "MDCTABLE".

In the basic storage expansion estimation technique, the table MDCTABLE is scanned and the cardinality of the cells for the specified dimensions is counted. MDCTABLE may be scanned and counted using an SQL statement, for example: select count(*) from (select distinct A, B, C from MDCTABLE) as CELL_CARD;

The execution of the SQL statement necessarily results in modeling of the inter-dimensional correlation automatically. The use of the basic storage expansion estimation technique provides the most precise estimation among the exemplary techniques; however, this technique is data processing intensive (in large MDCTABLES).

Sampled storage expansion estimation is similar to the storage expansion estimation, but exploits SQL query sampling to reduce the execution time. An exemplary SQL command is:

select count(*) from (select distinct A, B, C from MDCTABLE TABLESAMPLE BERNOULLI(<S>)) as CELL_CARD;

wherein <S> is the sampling rate. Once the sampled cardinality is known, the cardinality of the full set can be estimated by extrapolation using any one of a number of known statistical techniques such as those described in Haas, P. J., and Stokes, L., "Estimating the number of classes in a finite population", J. Amer. Statist. Assoc. (JASA), V. 93, December, 1998, pp. 1475-1487 and Haas, P. J., Naughton, J. F., Seshadri, S., Stokes, L., "Sampling Based Estimation of the Number of Distinct Values of an Attribute", Proceedings of the 21st VLDB Conference, Zurich Switzerland, 1995, each of which is incorporated herein by reference. Some of the statistical extrapolation techniques require frequency distribution data, necessitating a modification of the above query.

The results of performed experiments using the First Order Jackknife estimator, which does not require frequency distribution data, have shown that even a very low sampling rate (less than 1%) can be used with reasonable accuracy provided the table (e.g. MDCTABLE) is large enough that the sample contains at least several thousand tuples.

Parallel (multiplexed) estimation can employ two SQL variations that can be used to determine the cell cardinality for multiple clustering keys in a single SQL query. This form of estimation is described by way of an example:

Query #1: Return a single row with cell cardinalities in three columns.

```
select (select count(*) from (select distinct A,B,C from MDCTABLE)
as t1) as CELL_CARD_ABC,
    (select count(*) from (select distinct B,C from MDCTABLE) as
t2) as CELL_CARD_BC,
    (select count(*) from (select distinct A,C from MDCTABLE) as
t3) as CELL_CARD_AC
from (values(1)) as dummy;
```

Query #2: Return a row for each cell cardinality along with a column describing the type of cell cardinality.

```
select count(*) as CELL_CARD, 'CELL_CARD_ABC' as TYPE
from (select distinct A,B,C from MDCTABLE) as t1
   union all
   select count(*) as CELL_CARD, 'CELL_CARD_AB' as TYPE from
(select distinct B,C from MDCTABLE) as t2
   union all
   select count(*) as CELL_CARD, 'CELL_CARD_AC' as TYPE from
(select distinct A,C from MDCTABLE) as t3
```

Sampled-parallel estimation technique combines parallel (multiplexed) estimation and sampling, as will be apparent to those skilled in the art. Once the cardinality of cells has been determined, the space requirement for the proposed MDC table, when clustering across the requisite dimensions, may be determined in accordance with the equation:

$$S_{cl} = S_{ncl} + W_t \qquad (2)$$

wherein $S_{cl}$ is the resulting size of the clustered table after MDC; $S_{ncl}$ is the size of the base table before clustering, and W is the wasted space calculated using the above described equation (1). In a worst-case scenario when every record appears in it's own cell, the space waste is the larger of the result of the expression in equation (2) and $n_{cell}*\beta$. However, such a case indicates that the clustering solution is not particularly useful and the gross expansion will be detected by equation (2) in any event.

Figure 4:
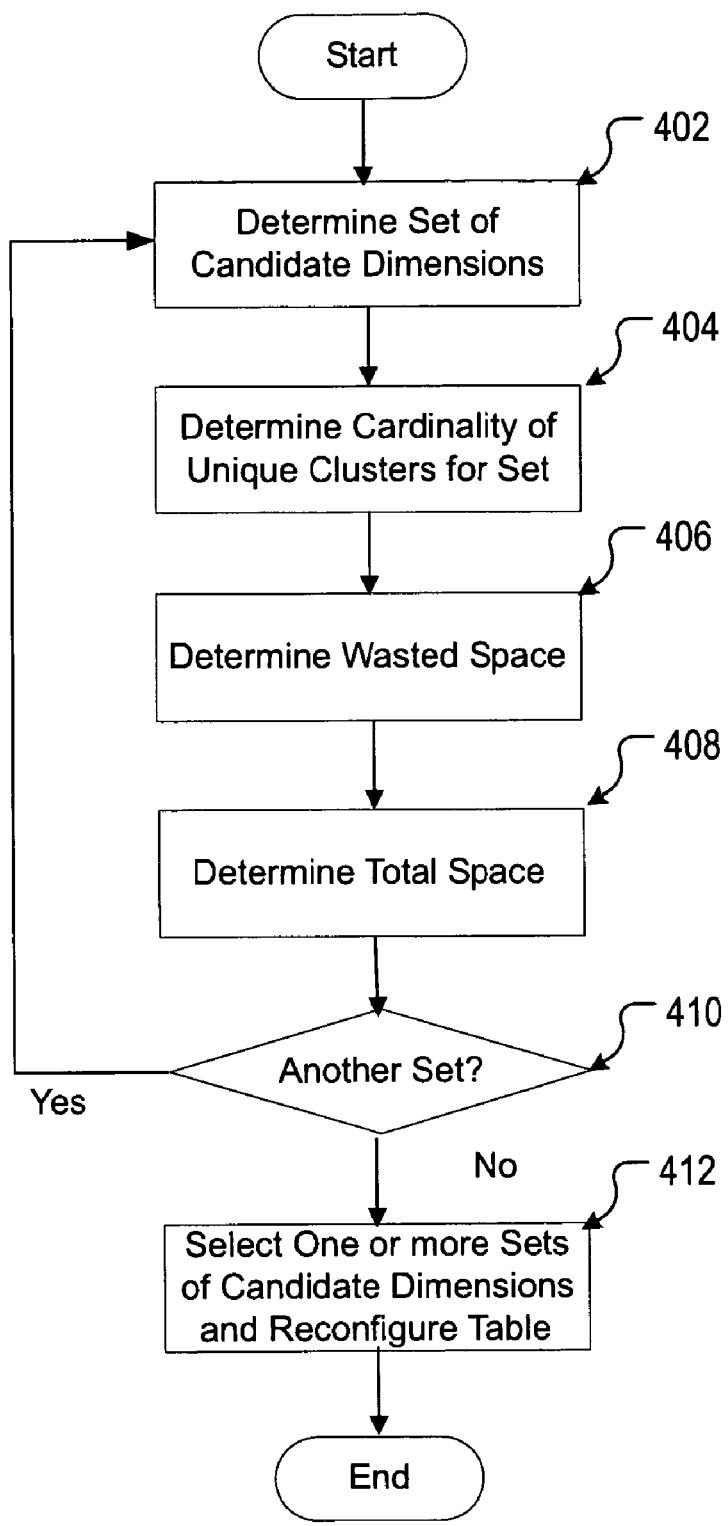
FIG. 4 is a process flowchart illustrating a system of operation of the storage requirements estimating system for a multi-dimensional clustering data configuration of FIG. 1.

FIG. 4 illustrates operations 400 of a system for estimating storage requirements for MDC data configuration. Initially, the candidate table and dimension tuples are determined or identified (Step 402). Using a cell cardinality determination technique, such as one of those previously described, cardinality of the unique clusters for the determined set of candidate dimensions (i.e., the expected cells ($n_{cell}$)) may be determined (Step 404). An estimate of the wasted space is proportional to the determined value of $n_{cell}$. Wasted space may be further determined in accordance with a block size for the anticipated storage and an average percentage fill for the end blocks of each cell such as defined in equation (1) (Step 408). As may be desired, a total space or size for the proposed MDC table may be computed using, for example, equation (2) (Step 408). Optionally, steps of the operations 400 (e.g., Step 402 to Step 404; Step 402 to Step 406; Step 402 to Step 408) may be repeated with other dimensions for the table (Step 410). Results are compared to facilitate a selection of a clustering proposal or candidate dimensions in response to the estimate of extra space required. Further, one or more actual MDC tables may then be generated in accordance with the selected clustering proposals (Step 412).

It should be understood by persons of ordinary skill in the art that the determinations of cell cardinality, waste space and storage expansion for different candidate clustering keys need not be performed sequentially as illustrated but may be performed together, for example, through a single SQL query increasing efficiency through parallel processing and likely improved cache hits in the buffer pool.

The system for estimating storage requirements in information retrieval systems in accordance with the present invention serves to assist selection of multidimensional clustering parameters for MDC. Candidate multidimensional clustering parameters can be evaluated through an estimation of the projected size of the MDC table.

It is to be understood that the specific embodiments of the invention that have been described are merely illustrative of certain applications of the principle of the present invention. Numerous modifications may be made to the system described herein without departing from the spirit and scope of the present invention.

What is claimed is:

1. A computer program product having a plurality of executable instruction codes, for determining an expansion of storage resulting from a candidate clustering scheme for data, the steps performed by the executable instruction codes comprising:

modeling an anticipated space waste to result from two or more multidimensional candidate clustering schemes, each multidimensional candidate clustering scheme defined by two or more clustering keys and configured to group data into a plurality of logical cells such that logically related data is stored in close proximity on a physical storage medium to reduce data access times, each unique logical cell defined by a unique combination of two or more clustering key values, each of the two or more clustering keys defining a dimension in the multidimensional candidate clustering scheme, each unique logical cell corresponding to one or more physical storage blocks in the physical storage medium, wherein the physical storage blocks have a block size, wherein each unique cell comprises a partially filled storage block from the data, wherein defining the anticipated space waste comprises calculating the anticipated space waste as a proportion of the block size, wherein modeling the anticipated space waste comprises:

determining a cardinality of unique cells to be created in accordance with the multidimensional candidate clustering scheme;

defining the anticipated space waste in proportion to the cardinality of unique cells;

wherein the anticipated space waste is determined in accordance with a following equation:

$$W = n_{cell} * P_\% * \beta,$$

where W is the anticipated space waste (W), $n_{cell}$ is a cardinality of unique clusters, $P_\%$ is an estimated proportion of each partially filled block that is waste space, and $\beta$ is the block size, and a second set of instruction codes for defining the expansion of data storage in proportion to the anticipated space waste, and defining expansion of data storage in proportion to the anticipated space waste for each candidate clustering scheme; and selecting one or more candidate clustering schemes that result in a least amount of expansion of storage.

2. The computer program product according to claim 1, wherein determining the cardinality comprises evaluating the cardinality by sampling and extrapolating data.

3. The computer program product according to claim 1, wherein determining the cardinality comprises counting the cardinality directly from the data.

4. The computer program product according to claim 1, wherein $P_\%$ ranges between approximately 50% and 100%.

5. The computer program product of claim 1, further comprising determining an expansion of storage for each of a plurality of candidate clustering schemes.

6. A database system that determines an expansion of storage resulting from a candidate clustering scheme for data, comprising:

means for modeling an anticipated space waste to result from two or more multidimensional candidate clustering schemes, each multidimensional candidate clustering scheme defined by two or more clustering keys and configured to group data into a plurality of logical cells such that logically related data is stored in close proximity on a physical storage medium to reduce data access times, each unique logical cell defined by a unique combination of two or more clustering key values, each of the two or more clustering keys defining a dimension in the multidimensional candidate clustering scheme, each unique logical cell corresponding to one or more physical storage blocks in the physical storage medium, wherein the physical storage blocks have a block size, wherein each unique cell comprises a partially filled storage block from the data, wherein defining the anticipated space waste comprises calculating the anticipated space waste as a proportion of the block size, wherein modeling the anticipated space waste comprises:

means for determining a cardinality of unique cells to be created in accordance with the multidimensional candidate clustering scheme;

means for defining the anticipated space waste in proportion to the cardinality of unique cells;

wherein the anticipated space waste is determined in accordance with a following equation:

$$W = n_{cell} * P_\% * \beta,$$

where W is the anticipated space waste (W), $n_{cell}$ is a cardinality of unique clusters, $P_\%$ is an estimated proportion of each partially filled block that is waste space, and $\beta$ is the block size, and means for defining expansion of data storage in proportion to the anticipated space waste for each candidate clustering scheme; and means for selecting one or more candidate clustering schemes that result in a least amount of expansion of storage.

7. The database system according to claim 6, wherein determining the cardinality comprises evaluating the cardinality by sampling and extrapolating data.

8. The database system according to claim 6, wherein determining the cardinality comprises counting the cardinality directly from the data.

9. The database system according to claim 6, wherein $P_\%$ ranges between approximately 50% and 100%.

10. The database system according to claim 6, further comprising means for determining the expansion of storage for each of a plurality of candidate clustering schemes.

* * * * *